Aug. 2, 1927.
F. E. McGRATH
AEROPLANE WING
Filed Oct. 26, 1925
1,637,954
2 Sheets-Sheet 1
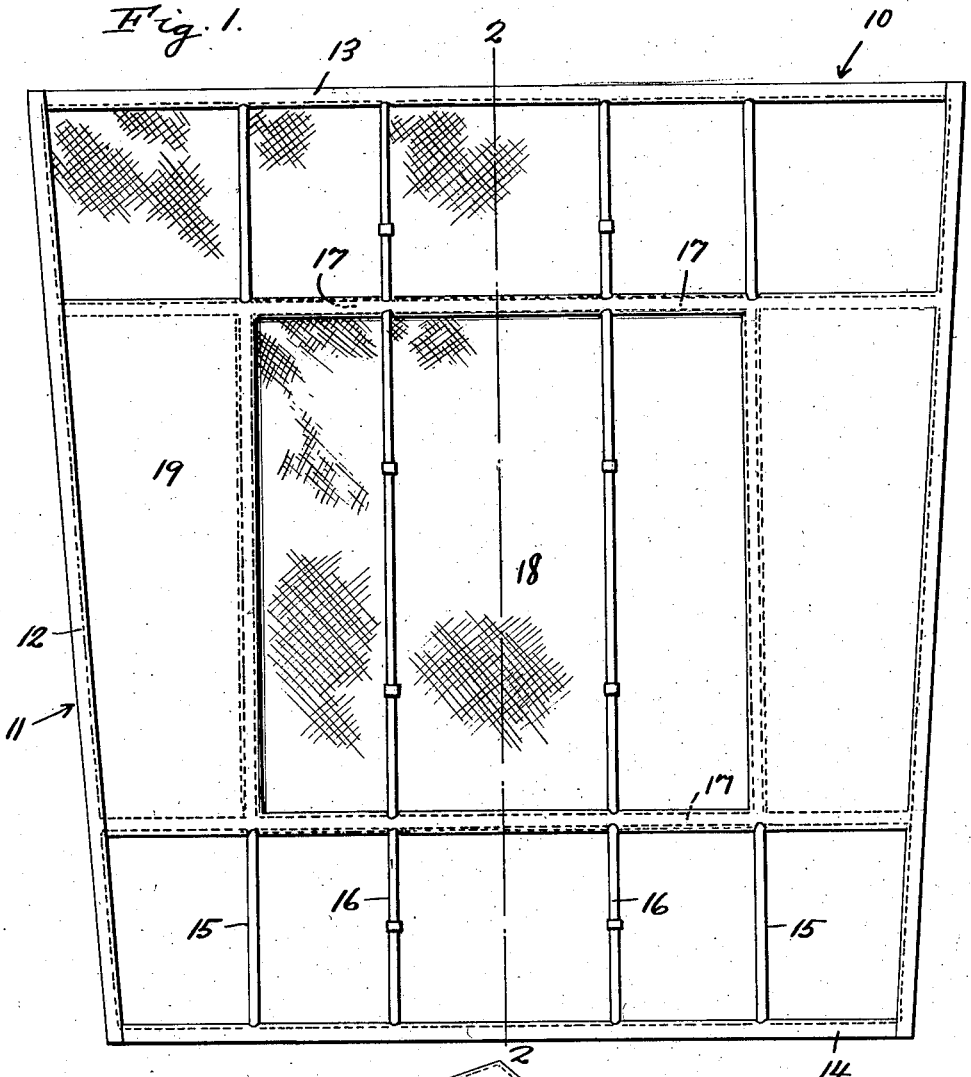
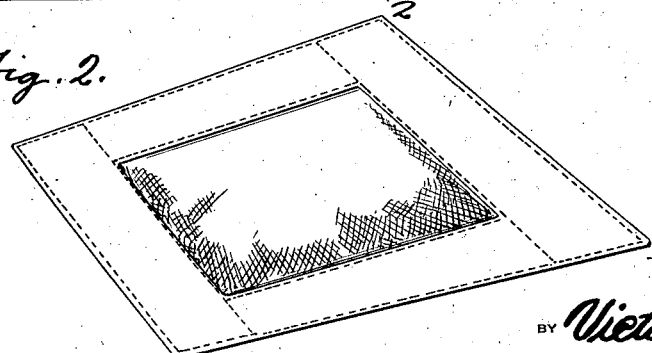

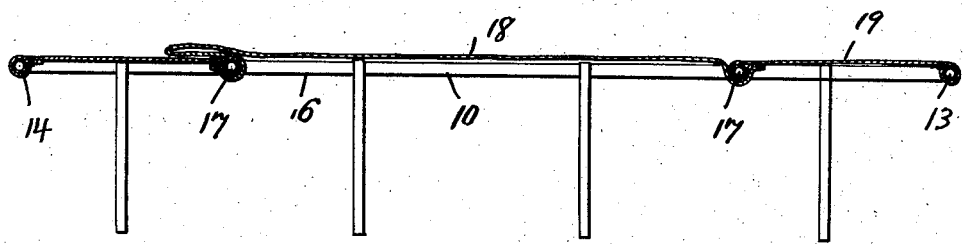
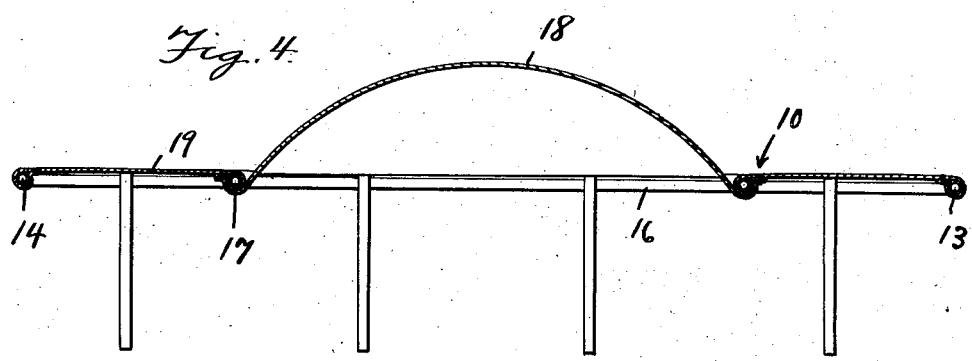

Patented Aug. 2, 1927.

1,637,954

UNITED STATES PATENT OFFICE.

FRED E. McGRATH, OF CLARKSBURG, MASSACHUSETTS.

AEROPLANE WING.

Application filed October 26, 1925. Serial No. 64,943.

This invention relates to aeroplanes, particularly to the structural elements thereof, and has for its object the provision of a novel aeroplane wing so constructed and arranged as to have a parachute action in case the aeroplane thus equipped falls owing to failure of the motor or for any other reason.

An important and more specific object is the provision of a wing construction so arranged as to provide a pocket which will open up or expand in case the machine tends to fall, the pocket consequently acting as a parachute for supporting the machine to a sufficient extent that a fall will not result in destruction thereof or serious injury to the pilot.

Still another object is the provision of a wing having the safety pocket therein so arranged as not to interfere with the ordinary action as for instance when ascending or traveling along a horizontal plane.

A further object of the invention is to provide a wing which is so shaped as to have the most efficient action under normal circumstances in addition to having the above mentioned parachute action.

An additional object is the provision of a wing of this character which will be simple and inexpensive in manufacture, easy to install, positive in action, durable in service, and a general improvement in the art.

With the above and other objects and advantages in view, the invention consists in the details of construction, and the arrangement and combination of parts to be hereinafter more fully described and claimed, and illustrated in the accompanying drawings, in which:—

Figure 1 is a plan view of a wing constructed in accordance with the invention.

Figure 2 is a perspective view.

Figure 3 is a cross section showing the safety pocket in its normal or collapsed condition.

Figure 4 is a similar view showing the safety pocket opened up to have the parachute action, and Figure 5 is a similar view showing a modification.

Referring more particularly to the drawings, the numeral 10 designates the wing as a whole, and it will be observed that it is constructed preferably in a trapezoidal shape as I have discovered that this is the most advantageous especially when the plane equipped with the wing is ascending.

The wing includes a suitable outer frame 11 including longitudinally extending members 12 and forward and rear cross members 13 and 14 respectively. Located within the confines of the frame is any desired number of longitudinally extending ribs 15, and located at the intermediate portion and extending in spaced parallel relation are supporting members 16. Quite naturally these various ribs and frame members may be curved, straight or shaped in any preferred manner especially as the invention does not reside in the details thereof but in the provision of the special feature to be described.

The important and in fact the essential portion of the invention resides in the provision of a parachute like pocket and in carrying out this detail, the intermediate portion of the wing, defined between the ribs 15 and other ribs or transverse supports 17 is covered with flexible material of any kind, for instance fabric indicated at 18 which is arranged loosely so that under normal circumstances, as illustrated in Figure 3, this loose material forming a pocket, will lie flat and substantially coextensive with the covering 19 for the major portion of the wing. However, it will be observed that this flexible portion 18 constituting the safety pocket is capable of being distended as shown in Figure 4, in case the plane makes a sudden drop or acts in any other manner to bring a sudden upward strain against the wing. Obviously, when this pocket is distended it will act more or less as a parachute and will exert a buoying action on the plane itself so that dropping thereof with excessive speed will be prevented. The fabric or covering may be arranged upon the entire upper side of the frame, while only a portion of the lower side of the frame may be covered as shown in Figure 1, or both the upper and lower sides may be covered as suggested in Figure 5, and of course the fabric or covering of both sides may be secured to each other as suggested, as well as to its frame including the ribs and supporting members thereof.

It is quite clear that the covering whether it be of fabric or any other material, may be secured to the frame in any desired manner, whatsoever, there being no limitation in this respect. It is also true that the portion of the wing outwardly of the pocket may be covered with veneer or other rigid material if such is preferred.

In case it is desired, for any reason, to reinforce this safety pocket, I may resort to the construction illustrated in Figure 5 wherein I have disclosed the covering upon the upper and lower sides of the frame and reinforcing ribs 20 which will serve to hold the pocket 21 in shape and prevent it from being distended or distorted to an excessive degree and the pocket 21 is provided with two thicknesses of the covering as shown, by extending the covering of both sides over the intermediate portion of the frame and thereby the pocket will also be materially reinforced by this arrangement.

From the foregoing description and a study of the drawings, it will be apparent that I have thus provided a novel aeroplane wing construction which will act under normal conditions in, exactly the same manner as any other wing but which possesses the additional feature of being capable of opening out to form a parachute and prevent falling of the plane at an excessive rate which might cause destruction thereto and injury to the pilot. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. In an aeroplane wing, a trapezoidal shaped frame including longitudinal and transverse elements, a fabric covering on the upper and lower sides of the frame, a portion of the covering being omitted at one side between the intermediate transverse and longitudinal elements and the remaining portion being left loose whereby to be capable of bagging and providing a parachute effect in case of sudden and unexpected descent of the plane.

2. In an aeroplane wing, a frame including outer members and a plurality of longitudinal and transverse intermediate members secured together to define a frame structure, a fabric covering secured to the upper side of the frame, a fabric covering secured to a portion of the lower side of the frame and also secured to the first named fabric, the fabric at the lower side being omitted at an area defined by the inner or intermediate transverse and longitudinal members and the portion of the fabric of the upper side at said area being left loose whereby to be capable of sagging or bagging to define a parachute in case of unexpected descent of the plane.

In testimony whereof I affix my signature.

FRED E. McGRATH.